United States Patent

Wood

[15] 3,680,185
[45] Aug. 1, 1972

[54] BLADES FOR RUBBER TIRE RASPS

[72] Inventor: Samuel Robert Wood, Warrawee, New South Wales, Australia

[73] Assignee: Kookaburra Retread Equipment Pty. Limited, Auburn, New South Wales, Australia

[22] Filed: March 31, 1970

[21] Appl. No.: 24,061

[30] Foreign Application Priority Data

April 1, 1969 Australia ..................... 52877/69

[52] U.S. Cl. ........................................... 29/79
[51] Int. Cl. ............................................. B23d 71/00
[58] Field of Search ........................... 29/78, 79, 103

[56] References Cited

UNITED STATES PATENTS 3,528,153  9/1970  Walter ............................. 29/79
217,305    7/1879  Tripp ............................. 29/103
2,896,309  7/1959  Jensen ............................. 29/79
2,975,504  3/1961  Bentham .......................... 29/79
3,082,506  3/1963  Jensen ............................. 29/79
3,102,325  9/1963  Hemmefer ........................ 29/79

Primary Examiner—Harrison L. Hinson
Attorney—Emory L. Groff and Emory L. Groff, Jr.

[57]  ABSTRACT

A rotary rasp blade of curved shape having along its outer edge a plurality of finger like teeth, the teeth being offset to both sides of the blade to form rows of teeth with each tooth in each row inclined in a direction opposite to its adjacent teeth in that row.

9 Claims, 6 Drawing Figures

PATENTED AUG 1 1972    3,680,185

INVENTOR
SAMUEL R. WOOD

By Emory L. Groff Jr
Atty

BLADES FOR RUBBER TIRE RASPS

This invention relates to toothed blades for rotary rasps of the type used to remove the tread from worn vehicle tires, preparatory to recapping or retreading, wherein the blades stamped from relatively thin sheet metal are mounted in a rasp body or "holder", generally so as to form a helix or helices.

The holder is adapted to be mounted in a machine whereby it can be manipulated so that when it rotates the teeth of the blades therein will rasp the surface of the tire.

This invention has been devised to provide a rasp blade having a tooth construction which when compared with tooth constructions of known rasp blades under comparable working conditions has a longer effective life and is generally more efficient in that it will cut more quickly.

According to this invention the blade has a convexly curved outer edge in which is formed a plurality of pairs of finger teeth, the teeth of each pair being inclined in the same direction and oppositely to the teeth of the adjacent pairs, the tips of said teeth being disposed in at least two transversely spaced rows there being at least one row of set teeth to each side of said blade, those teeth having their tips in a row each being oppositely inclined to the adjacent teeth having their tips in that row.

Several presently preferred embodiments of the invention are illustrated in the annexed drawings, wherein.

Figure 1:
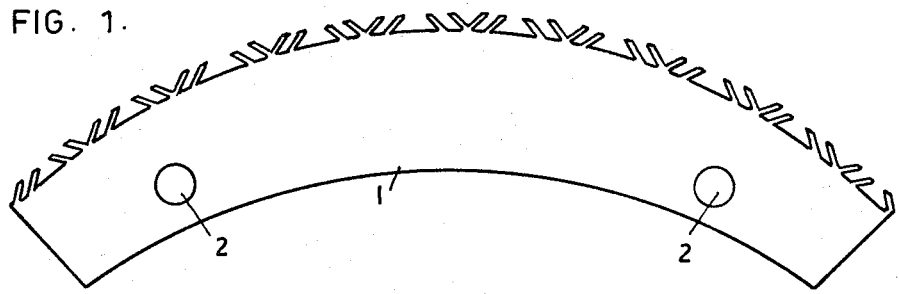
FIG. 1 is an elevation of the blade according to one embodiment.
Figure 2:
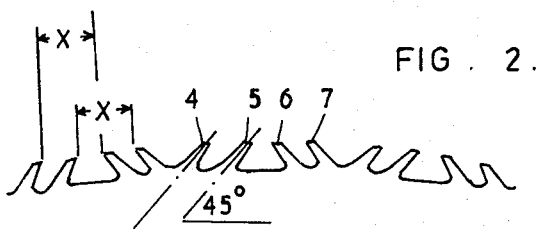
FIG. 2 is an enlarged fragmentary elevation of the teeth of the blade of FIG. 1.

As illustrated in FIGS. 1 and 2 the blade is formed as a segment, is made from sheet metal and comprises a body 1 with holes 2 therein whereby the segment and others can be mounted in a rasp body (not shown). The segment has a convexly curved side in which there is formed a plurality of finger like teeth indicated generally as 3. The teeth are arranged in pairs 4, 5 and 6, 7, with the longitudinal axes of the teeth to each pair of teeth inclined at substantially the same angle to the periphery of the curved side and each pair is inclined oppositely of tis adjoining pairs.

Figure 3:
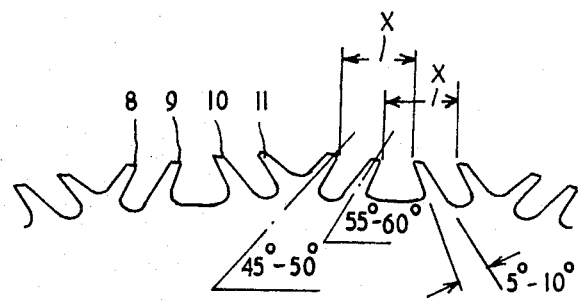
FIG. 3 is an enlarged fragmentary elevation of the teeth of a blade according to the second embodiment, and, FIGS. 4, 5 and 6 are fragmentary top views of the teeth of the blade of FIGS. 1 to 3 showing alternative modes of tooth setting.

As illustrated in FIG. 3 the teeth 8, 9 and 10, 11 have the same general disposition as those of FIGS. 1 and 2 except that the longitudinal axes of the teeth of each pair of teeth converge as the teeth extend away from the blade body.

In the embodiment shown in FIGS. 1, 2 and 3 the teeth sides converge from root to tip so as to give the teeth strength and so that there will be a minimum rubbing surface at the tip. A suitable angle of taper for the sides of each tooth is from 5° to 10°.

It has been found that certain tooth angles and tooth spacings give better results than other tooth angles and spacings. Without limitation, and as used in a 9 inch rasp body the following tooth angles and spacings are given by way of example. In embodiment of FIG. 1 and FIG. 2 the tooth angle is one in the order of 45° to the convex peripheral surface of the blade.

In embodiment illustrated in FIG. 3 the axes of the respective teeth of each pair of teeth are at an angle in the order of 55° to 60° and 45° to 50° to the periphery of the blade, the 55°–60° inclined teeth being adjacent each other in each group of two converging pairs. The distance (X of FIGS. 2 and 3) between the first and third or second and fourth teeth of each group is in the order of 0.2 inch to 0.3 inch. A tooth depth in the order of 0.15 to 0.18 inches may be used with teeth of the foregoing dimensions.

Figure 4:
Figure 5:
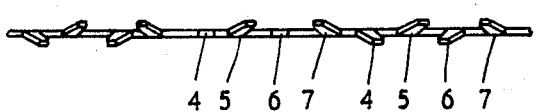
Figure 6:
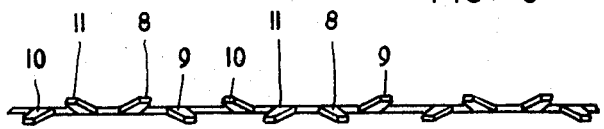

The teeth of both embodiments (FIGS. 2 and 3) can be set according to the patterns shown in FIGS. 4, 5 or 6. As illustrated in FIG. 4 alternate teeth are set in opposite directions from the plane of the blade body. As illustrated in FIG. 5 the setting of FIG. 4 is modified in that spaced teeth along the blade periphery are not set. As illustrated in FIG. 6 certain tooth dispositions are repeated in sequence throughout the length of the blade so that consecutive diverging pairs of teeth constitute groups and the second and third teeth of each group are oppositely set to the first and fourth teeth of that group.

I claim:

1. A rasp blade formed from sheet metal and adapted to be mounted with others in a rotatable holder, said blade having a planar body and a convexly curved working edge formed with a plurality of pairs of elongated and finger-like teeth, each tooth when viewed normally to the plane of the body having its tip on said edge and its profile bounded by lines intersecting said edge, the extensions of said lines meeting at a small inclined angle beyond the edge, the teeth of each pair being inclined in the same direction and oppositely to the teeth of the adjacent pairs and having a circular pitch exceeding twice the maximum tooth width, the tips of said teeth being set laterally so as to lie on arcs parallel to and displaced from the plane of the body, there being at least one row of set tips to each side of the body, those teeth having their tips in a row each being oppositely inclined to the teeth next having tips in that row.

2. A rotary rasp blade formed from sheet metal and adapted to be mounted side by side with like blades inclined oppositely to the teeth a rotatable holder, said blade having a planar body part and a convexly curved outer edge, a single row of elongated similar finger-like teeth formed in the body with the tips of the teeth terminating with lands which are parts of the curved outer edge of said body, said teeth being arranged in pairs, the teeth of each pair being adjacent each other and inclined in the same direction so that each tooth has a straight longitudinal axis which lies at an angle other than 90° to a tangent to the land of that tooth, the teeth of each pair also being inclined oppositely to the teeth of the adjacent pairs, the tips of said teeth being located along at least two transversely spaced arcs of substantially equal curvature there being at least one tooth tip arc to each side of said blade, the teeth having their tips common to an arc each being oppositely inclined to the adjacent teeth having tips common to the same arc.

3. A blade as claimed in claim 2 wherein the longitudinal axes of the teeth of each pair are substantially parallel.

4. A blade as claimed in claim 2 wherein the longitudinal axes of the teeth of each pair converge as the teeth extend outwardly to the outer edge of the body.

5. A blade as claimed in claim 2 wherein the longitudinal axis of each tooth is at an angle of the order of 45° to a line at the tooth tip which is at a tangent to the arc including the tooth tip and the distance between the first-third and second-fourth teeth of each group of two converging pairs is of the order of 0.2" to 0.3".

6. A blade as claimed in claim 2 wherein the longitudinal axes of the teeth of each pair are respectively at an angle of the order of 45° and 55° to 60° to lines at the teeth tips which lie at a tangent to the respective arcs including the teeth tips, said 55°–60° inclined teeth being adjacent each other in each group of two converging pairs and the distance between first-third and second-fourth teeth of each such group is of the order of 0.2 inch to 0.3 inch.

7. A blade as claimed in claim 2 wherein alternate teeth are oppositely set.

8. A blade as claimed in claim 2 wherein consecutive diverging pairs of teeth constitute groups and the second and third teeth of each group are oppositely set to the first and fourth teeth of that group.

9. A blade as claimed in claim 2 wherein some of the teeth are unset.

* * * * *